(12) United States Patent
Kirk

(10) Patent No.: X7815
(45) Date of Patent: Nov. 19, 1833

(54) SAW MILLS

(76) Inventor: Nathan Kirk

Nathan Kirk
Letters Patent

The Schedule referred to in these Letters Patent and making part of the same containing a description in the words of the said Nathan Kirk, himself of his improvements in

---

To all to whom these Presents shall come —

Be it known that I Nathan Kirk of the County of Clinton and State of Indiana have invented a new and useful improvement in the construction and principle of common saw Mills and that the following is an exact description of the construction and operation of said Machine as invented and improved by me. The invention consists in the improvement of common saw-mills, so that by the mere operation of Machinery, boards and scantling &c may be sawed to any given gauge without the assistance of human power, after the log has been slabbed and properly secured. The process is to secure a log upon the carriage, having been slabbed, start the Mill by raising the flutter wheel gate, the log is sawn through; the same movement raises the feed arm or hand shuts the flutter wheel gate, and raise the gig wheel gate, — the carriage is run back until the saw leaves the log when by the operation of the Machinery in the head block and tail block the log is moved the width of the plank intended, the log is again secured at the head block, the gig wheel gate is shut, the flutter wheel gate, is raised and the saw commences cutting again, and so on until the whole log is sawn up, when a pivot on the carriage touches a lever which stops the whole mill. The effect is shown in the process or operation.
There are three principle operations of the improvement. To wit:
1. the shifting of the log by means of Machinery attached to the head block and tail block. 2nd, the working of the flutter wheel gate, and the gig wheel gate — 3d. the running the carriage backward and forward which two last are [illegible], with each other. 1st The Machinery in the head and tail blocks is substantially the same we therefore will only be attempted to be described. In the middle of the head block, and on the [illegible]

principle of a lever, the roller gauge works. It has an oblique groove in
the lower extremity, and a key (no. 7) attached to the upper extremity. The
groove by the motion of the carriage comes in contact with a permanent
point, causing a lateral movement in the roller gage, which forces key no. 7
against the gage notches, in block (A) which having the log bar (no. 6.)
attached to it moves the log. On one side of the roller gage, there is a
spring to keep key no. 7 firm in the notches, in the under side of gage
block (A). On the opposite side is a catch removed D. which fastens in
the gage notches (while the mill is sawing) in opposition to key 7. just be-
fore the shifting of the log this latter key is withdrawn by passing over a per-
manent point, so as to let the notches pass. it is then restored to its place
by a spring. 2d & 3d The two water gates, are moved by machinery attach-
ed to opposite ends of a lever. so that when one is opened the other is
shut. The Mill is put in motion by raising the flutter wheel gate.
By the passage of the carriage the gate beam (M) is raised being attached
by a chain or cord, to the beam raiser which corresponds to, and is ope-
rated upon by the oblique cogs at the side of the carriage. Before the log
is sawn through, the Beam (M) is caught upon a notch, where it re-
mains until the carriage returns and is ready to commence sawing, when
a point on the carriage strikes a lever throws off the notch, the beam
comes down with such an impetus, as to raise the large gate and to shut
the gig wheel gate, when the Mill commences sawing. The suction created
in the large gate is so great as to raise the small one, and the large gate as
before stated is raised by the impetus of the beam falling upon the opposite end
of the lever or the Machinery attached thereto; Attached to the downward
motion of the flutter wheel gate, is a lever having one end under the feed
hand, whereby it is thrown off the rag wheel to give the carriage liberty
to run back.

The log is confined at the tail block with dogs in the usual
manner. At the head block it is confined during sawing by the log
bar made fast to the log by plate dogs nos. 2 & 3 - and bar dog no. 4.
The log bar is fastened to block (A.) which being operated upon by the
machinery in head block (B) moves the log. Tumbling dog no. 1.

United States Patent

Patent No.: X7815 confines the log down during sawing, and just before the operation of shifting the log comes in contact with plate (x) attached the guides, by which its hold upon the log is loosened. As soon as sawing commences a spring under the tumbling dog restores it to its place Nathan Kirk Exd.

Witnesses

Jas A. Magnell

S. F. Miles (938 words)